United States Patent [19]
Silby, deceased

[11] 3,753,724
[45] Aug. 21, 1973

[54] LIQUEUR PREPARATION FROM MILK

[75] Inventor: Harry Silby, deceased, late of Miami, Fla. by Mayme Silby, executrix

[73] Assignee: Wire Sales Company, Chicago, Ill.

[22] Filed: May 5, 1971

[21] Appl. No.: 140,370

Related U.S. Application Data

[63] Continuation-in-part of Ser. No. 32,438, April 27, 1970, abandoned.

[52] U.S. Cl.............................. 99/30, 99/34, 99/38
[51] Int. Cl.............................................. C12g 3/04
[58] Field of Search ..................... 99/29, 30, 34, 38

[56] References Cited
UNITED STATES PATENTS
2,783,147  2/1957  Pauls et al. .............................. 99/38
3,050,397  8/1962  Carroll.................................... 99/30

FOREIGN PATENTS OR APPLICATIONS
1,942  1870  Great Britain.......................... 99/34

OTHER PUBLICATIONS

Heinstein et al.; Chemistry and Technology of Wines and Liquors, D. Van Nostrand Company, Inc. N.Y., 2nd Ed., 1948, pp 53-55 and 217-225

Primary Examiner—David M. Naff
Attorney—Beveridge & De Grandi

[57] ABSTRACT

A liqueur is prepared by fermenting a mixture of uncooked milk, alcohol, sugar, lemon and vanilla. No distillation is involved and all pure flavorings and colorings are utilized. After fermentation and filtration of solids, additional uncooked milk is added to the filtrate for a second fermentation step. The solids recovered after the filtration contain fat from the milk and may be used for other purposes.

12 Claims, No Drawings

LIQUEUR PREPARATION FROM MILK

This application is a continuation-in-part of my copending application, Ser. No. 32,438, filed Apr. 27, 1970 and now abandoned, the full disclosure of which is relied upon herein.

The present invention relates to the preparation of a liqueur from natural and pure food substances without requiring the addition of any artificial colorings or flavors. In the past many liqueurs have been produced by fermenting a specific herb or group of herbs and/or fruit and the like in the conventional manner, followed by distillation of the resulting mash to the desired concentration (proof) of alcohol desired. Alternatively, various flavor and coloring extracts and additives have been incorporated into alcohol bases, however, these procedures have generally required distillation. Thus, generally either the flavors are a flavor distillate or the composition is distilled to produce the desired alcoholic content.

The present invention differs from previously known methods of producing liqueurs in that it utilizes milk and involves no distillation and uses no artificial flavoring or coloring. The essential ingredients in preparing the liqueur of this invention are uncooked, homogenized milk, sugar, lemon, vanilla and alcohol. Instead of the usual brandy base which is employed by many liqueurs, the liqueur of this invention utilizes pure 95 percent ethylalcohol and contains the major portion or the nutritive content of milk and derives additional flavor and coloring from the lemon and vanilla. The addition of the sugar to the formulation is to characterize its sweetness and result in its classification as a liqueur.

Prior art procedures involving distillation result in a time consuming and expensive operation and also may result in alteration or deterioration of the flavor. The present process avoids distillation and thereby prevents the development of off-flavors and loss of valuable volatile constituents. The high nutritive quality of milk is retained in the product and the precipitate which contains much of the protein and fat from the milk can be recovered and used for other purposes.

In carrying out the invention, in its more particular aspects, a suitable vessel, reactor or other container suitable for fermentation processes, preferably provided with a cover is used. Apparatus for fermentation processes are well known in the art and any suitable apparatus can be used for this invention. The ingredients may be charged to the reaction vessel in any convenient manner. The milk is uncooked and homogenized, the sugar preferably in the form of fine granulated sugar, the lemon may conveniently be cut into small pieces, for example ½ inch to 1 inch sections and the vanilla is also in small pieces or finely divided form. The alcohol employed is pure 95 percent ethyl alcohol (190 proof). The ingredients are mixed together and permitted to undergo fermentation for a period ranging from 10 to 15 days, preferably about 14 days in the absence of light. Intermittent agitation can be provided during the fermentation. Thereafter the solids are filtered and at this stage, the filtrate which is liqueur may be bottled and packaged. The solids recovered in the precipitate contain the fat and protein content of the milk which can be used for other purposes, such as animal feed, specialty foods for persons on restricted diets and the like.

In accordance with a further embodiment of the invention a second fermentation may be carried out after filtration of solids following completion of the initial fermentation step. For example, after filtration of the solids from the initial fermentation, the filtrate which is liqueur may be further treated by adding thereto and mixing therewith additional whole milk (uncooked) and carrying out another fermentation reaction. The milk may be added to the filtrate in the proportions of 30 to 50 percent by volume milk to 50 to 70 percent by volume of the liqueur. Preferably, the amount of milk that is added to the liqueur is four parts by volume (40 percent) of whole milk to 6 parts by volume (60 percent) of liqueur. The second fermentation step may be conducted under the same conditions as the first fermentation step, although this can be varied to be shorter or longer as desired. No distillation or special heating is necessary. At the conclusion of the second fermentation step, a heavy casein like mass is obtained which may again be filtered to produce the final product. As a result of the second fermentation step, the liqueur product has a much smoother, less alcoholic irritating, taste with the result that a superior, more palatable drink is obtained.

By carrying out the second fermentation step, a more dietetic drink is obtained wherein the amount of sweetness is considerably reduced.

The following examples are illustrative of the present invention:

EXAMPLE I

Using a glass lined vessel provided with a cover, the following ingredients were added:

1 quart homogenized milk (not cooked)
1/5 gallon pure 95 percent alcohol (190 proof)
2 lbs. fine granulated sugar
2 average size lemons cut into small pieces
1 stick of vanilla (vanilla bean 6 inches in length) cut into small pieces averaging ½ inch in size.

The ingredients are mixed together and permitted to undergo fermentation for 14 days with agitation from time to time. The fermentation is carried out in the dark. Thereafter, the composition is filtered to remove the milk solids and the filtrate liqueur is ready for bottling and packaging.

EXAMPLE II

Using the filtrate liqueur produced in Example I, a second fermentation step is carried out as follows:

4 parts by volume of whole, uncooked milk
6 parts by volume of the liqueur product of Example I.

The above ingredients are mixed together and permitted to undergo fermentation for a period of 14 days with agitation from time to time. The fermentation is carried out in the dark. After conclusion of the fermentation a heavy, casein like mass is obtained which is then filtered. The filtrate liqueur is then ready for packaging.

The vanilla bean used according to this invention is usually obtained in lengths of about 5–10 inches, and averages about 6 inches in length. This bean is referred to as a "stick" of vanilla in the example.

While the nature of the liqueur of this invention is such that the proportions can be varied as will be clear to one skilled in the art, as a general guideline the mixture comprises 50 to 60 percent by volume of the milk, 40 to 50 percent by volume of 95 percent ethyl alcohol, 4 to 5 pounds of granulated sugar per gallon of the mixture, 4 to 5 average sized lemons per gallon of mixture, 1¾ to 3 sticks of vanilla per gallon of mixture.

The preferred composition contains the following proportions:

- 55.5 percent by volume, uncooked, homogenized milk
- 44.5 percent volume, 95 percent ethyl alcohol
- 4.45 pounds of granulated sugar per gallon
- 4.5 average sized lemons per gallon
- 2¼ sticks of vanilla per gallon The fermentation is generally carried out at room temperature or ambient temperature and does not require any heating. No distillation is required and the fermented composition can be filtered with any customary filtering equipment and procedures which are known in the liqueur art. Similarly, the equipment employed in carrying out the fermentation, i.e., the containers and agitation means are any of those which are readily available and widely known in the fermentation art.

I claim:

1. A method for the production of a liqueur which comprises forming a mixture of the following ingredients:

uncooked homogenized milk
    95 percent (190 proof) ethyl alcohol
    granulated sugar
    lemons cut into small pieces
    vanilla covering the ingredients and fermenting the ingredients essentially in the absence of light for a period of from 10 to 15 days, and thereafter filtering the solids to obtain the liqueur filtrate ready for bottling.

2. The method as defined in claim 1 wherein the ingredients are agitated during the fermenting period.

3. The method as defined in claim 1 wherein the temperature during fermentation is ambient temperature.

4. The method of claim 1 wherein the milk is present in the amount of about 50–60 percent by volume.

5. The method of claim 1 wherein the milk is present in the amount of about 55.5 percent by volume.

6. The method as defined in claim 1 wherein the mixture comprises:

- 50 to 60 percent by volume, uncooked, homogenized milk
- 40 to 50 percent by volume, 95 percent ethyl alcohol
- 4 to 5 pounds of granulated sugar per gallon of mixture
- 4 to 5 average lemons per gallon of mixture
- 1¾ to 3 sticks of vanilla per gallon of mixture.

7. The method as defined in claim 1 wherein the mixture comprises:

- 55.5 percent by volume, uncooked, homogenized milk
- 44.5 percent by volume, 95 percent ethyl alcohol
- 4.45 pounds of granualted sugar per gallon of mixture
- 4.5 average lemons cut into small pieces per gallon of mixture
- 2¼ sticks of vanilla per gallon of mixture.

8. The method of claim 1 which includes the further step of contacting said liqueur filtrate with additional whole, uncooked milk and carrying out a second fermentation step, filtering the solids and obtaining a liqueur filtrate ready for bottling.

9. The method as set forth in claim 8 wherein the additional milk is present in the amount of 30 to 50 percent by volume and the amount of liqueur is 50 to 70 percent by volume.

10. The method as set forth in claim 8 wherein the additional milk is present in the amount of 40 percent by volume and the amount of liqueur is 60 percent by volume.

11. A liqueur composition prepared in accordance with the method of claim 1.

12. A liqueur composition prepared in accordance with the method of claim 8.

* * * * *